(12) United States Patent
Krampotich et al.

(10) Patent No.: US 9,891,399 B2
(45) Date of Patent: Feb. 13, 2018

(54) PACKAGING ASSEMBLY FOR TELECOMMUNICATIONS COMPONENTS

(71) Applicant: ADC TELECOMMUNICATIONS, INC., Berwyn, PA (US)

(72) Inventors: Dennis Krampotich, Shakopee, MN (US); Michael J. Schomisch, Rosemount, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/036,331

(22) PCT Filed: Nov. 6, 2014

(86) PCT No.: PCT/US2014/064380
§ 371 (c)(1),
(2) Date: May 12, 2016

(87) PCT Pub. No.: WO2015/073299
PCT Pub. Date: May 21, 2015

(65) Prior Publication Data
US 2016/0299307 A1 Oct. 13, 2016

Related U.S. Application Data

(60) Provisional application No. 61/903,040, filed on Nov. 12, 2013.

(51) Int. Cl.
*G02B 6/00* (2006.01)
*G02B 6/44* (2006.01)
(Continued)

(52) U.S. Cl.
CPC ....... *G02B 6/4453* (2013.01); *B65D 19/0004* (2013.01); *B65D 19/44* (2013.01);
(Continued)

(58) Field of Classification Search
CPC .................................................. G02B 6/4457
See application file for complete search history.

(56) References Cited

U.S. PATENT DOCUMENTS 5,069,523 A * 12/1991 Finzel .................. G02B 6/4452
385/135
6,504,986 B1 * 1/2003 Wambeke ................ G02B 6/38
385/134
(Continued)

FOREIGN PATENT DOCUMENTS

EP 2 185 962 B1 8/2012

OTHER PUBLICATIONS

International Search Report and Written Opinion of the International Searching Authority for International Patent Application No. PCT/US2014/064380 dated Feb. 27, 2015, 12 pgs.

*Primary Examiner* — Rhonda Peace
(74) *Attorney, Agent, or Firm* — Merchant & Gould P.C.

(57) ABSTRACT

An assembly including a pallet, a carousel mounted on the pallet, a plurality of tray assemblies stacked one on top of the other on the carousel. Each of the tray assemblies include a tray body, at least one fiber optic adapter supported at a top side of the tray body and a first spool mounted beneath the tray body. The first spool has spaced-apart flanges and fiber optic cable wrapped about the first spool at a location between the spaced-apart flanges. At least some of the flanges of the first spools of adjacent tray assemblies are coupled together.

9 Claims, 11 Drawing Sheets

(51) Int. Cl.
*B65H 49/28* (2006.01)
*B65H 49/32* (2006.01)
*B65D 19/00* (2006.01)
*B65D 19/44* (2006.01)
*G02B 6/38* (2006.01)

(52) U.S. Cl.
CPC ............ *B65H 49/28* (2013.01); *B65H 49/322* (2013.01); *B65H 49/328* (2013.01); *G02B 6/3897* (2013.01); *G02B 6/4441* (2013.01); *G02B 6/4452* (2013.01); *G02B 6/4457* (2013.01); *B65H 2701/32* (2013.01); *B65H 2701/534* (2013.01); *G02B 6/4416* (2013.01)

(56) References Cited

U.S. PATENT DOCUMENTS

| | | | | |
|---|---|---|---|---|
| 6,625,374 | B2* | 9/2003 | Holman | G02B 6/4453 |
| | | | | 385/134 |
| 6,715,710 | B1* | 4/2004 | Russell | B65H 75/18 |
| | | | | 242/605 |
| 7,715,679 | B2* | 5/2010 | Kowalczyk | G02B 6/3897 |
| | | | | 242/372 |
| 8,074,916 | B2* | 12/2011 | Penumatcha | B65H 75/14 |
| | | | | 242/604 |
| 8,238,707 | B2* | 8/2012 | Smrha | B65H 75/14 |
| | | | | 385/135 |
| 8,351,754 | B2* | 1/2013 | Bell | B65H 49/322 |
| | | | | 385/135 |
| 8,480,023 | B2* | 7/2013 | Penumatcha | B65H 75/14 |
| | | | | 242/604 |
| 8,565,572 | B2 | 10/2013 | Krampotich et al. | |
| 8,660,397 | B2* | 2/2014 | Giraud | G02B 6/4441 |
| | | | | 385/135 |
| 8,886,003 | B2* | 11/2014 | Nieves | G02B 6/4446 |
| | | | | 385/134 |
| 9,038,936 | B1* | 5/2015 | Maddern | B65H 75/406 |
| | | | | 242/405 |
| 9,042,700 | B2 | 5/2015 | Smith et al. | |
| 9,126,800 | B2* | 9/2015 | Penumatcha | B65H 75/14 |
| 9,146,374 | B2* | 9/2015 | Ott | G02B 6/4457 |
| 9,170,392 | B2* | 10/2015 | Krampotich | G02B 6/4452 |
| 9,341,802 | B2* | 5/2016 | Krampotich | G02B 6/4452 |
| 9,470,869 | B2* | 10/2016 | Ott | G02B 6/4457 |
| 9,555,999 | B2* | 1/2017 | Smith | B65H 75/146 |
| 9,632,273 | B2* | 4/2017 | Smith | G02B 6/4457 |
| 2004/0050996 | A1 | 3/2004 | Russell et al. | |
| 2008/0191436 | A1 | 8/2008 | Galgano et al. | |
| 2008/0292261 | A1* | 11/2008 | Kowalczyk | G02B 6/3897 |
| | | | | 385/135 |
| 2011/0268415 | A1* | 11/2011 | Fabrykowski | G02B 6/4471 |
| | | | | 385/135 |
| 2012/0025005 | A1 | 2/2012 | Smith et al. | |
| 2013/0170811 | A1 | 7/2013 | Kowalczyk et al. | |
| 2014/0091169 | A1* | 4/2014 | Ott | G02B 6/4457 |
| | | | | 242/594.5 |
| 2015/0329312 | A1 | 11/2015 | Smith et al. | |
| 2016/0299307 | A1* | 10/2016 | Krampotich | B65H 49/28 |

* cited by examiner

PACKAGING ASSEMBLY FOR TELECOMMUNICATIONS COMPONENTS

CROSS-REFERENCE TO RELATED APPLICATION(S)

This application is a National Stage of PCT International Patent application No. PCT/US2014/064380 and claims priority to U.S. Patent Application Ser. No. 61/903,040 filed on Nov. 12, 2013, the disclosures of which are incorporated herein by reference in their entireties. To the extent appropriate, a claim of priority is made to each of the above disclosed applications.

TECHNICAL FIELD

The present invention relates generally to devices and methods for deploying, routing, housing, storing, shipping, connecting, and managing telecommunications cable and connections.

BACKGROUND

Telecommunication cabling systems typically include cabinets that house terminations and connections/interconnections of telecommunication cables. The telecommunication cables can include electrical cable, fiber optic cable, and/or hybrid cable that includes both electrical and optical conductors. The cabinets typically allow terminations of the various cables to be connected, disconnected, and/or reconnected to other terminations of the various cables. In this way, the routing of signals across a telecommunications network can be configured and reconfigured as desired. For example, a trunk cable from a main office of a telecommunications provider or a data center may be branched to various branch cables at the cabinet. Each of the branch cables may then be routed to an end-user or to another cabinet.

The telecommunications cable can be stored on, delivered on, and deployed by spools. The cable is typically wound on the spool at a factory. Upon delivery to an installation site, the cable can be unwound from the spool and deployed. The cabinet can hold terminations/connectors of the cables that are routed to it.

SUMMARY

An aspect of the present disclosure relates to an assembly including a pallet, a carousel mounted on the pallet, and a plurality of tray assemblies stacked one on top of the other on the carousel. Each of the tray assemblies include a tray body, at least one fiber optic adapter supported at a top side of the tray body, and a first spool mounted beneath the tray body. The first spool having spaced-apart flanges and a fiber optic cable wrapped about the first spool at a location between the spaced-apart flanges. At least some of the flanges of the first spools of adjacent tray assemblies are coupled together.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Figure 1:
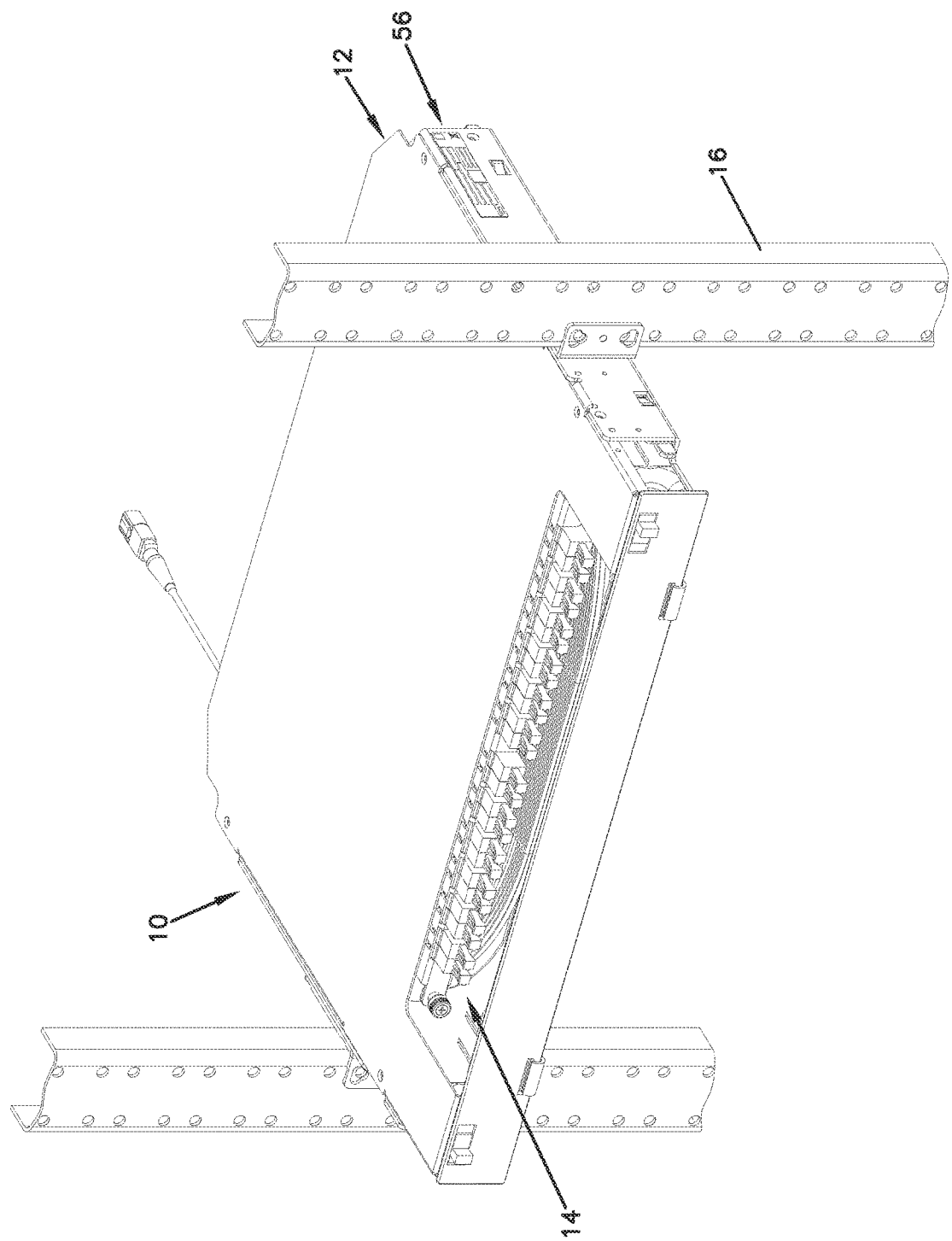
FIG. 1 is a perspective view of a telecommunications assembly having exemplary features of aspects in accordance with the principles of the present disclosure.
Figure 2:
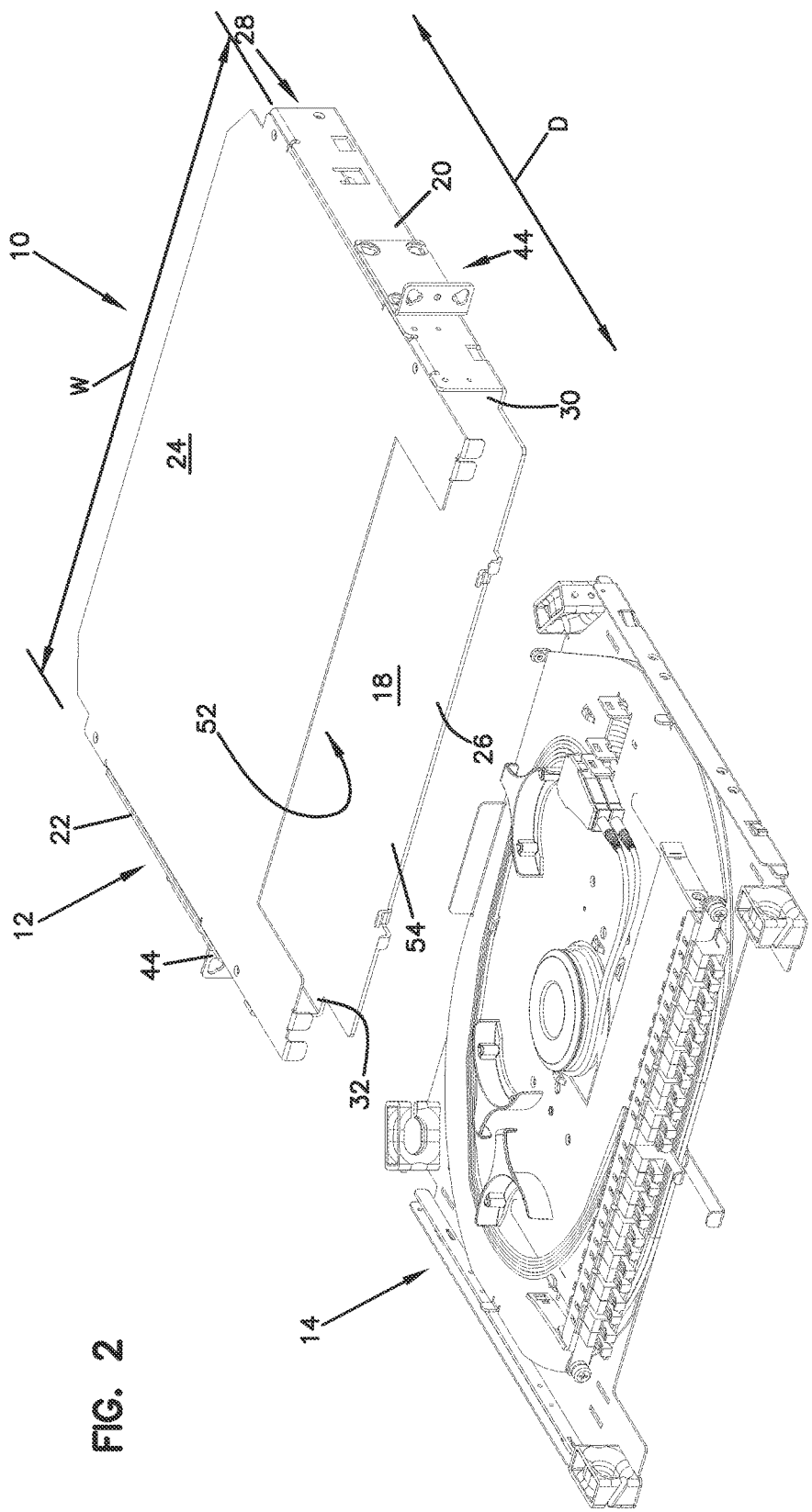
FIG. 2 is an exploded perspective view of the telecommunications assembly of FIG. 1.

Referring now to FIGS. 1-2, a telecommunications assembly 10 is shown. The telecommunications assembly 10 includes a chassis 12 (e.g., an enclosure, a case, etc.) and a tray assembly 14 (e.g., a shelf assembly, a drawer assembly, etc.) that removably mounts in the chassis 12. The telecommunications assembly 10 is adapted for mounting to a telecommunications rack 16. In other examples, the telecommunications assembly 10 can include a chassis sized for holding multiple tray assemblies 14 (e.g., 2, 3, 4, 5, 6 or more tray assemblies).

Referring to FIG. 2, the chassis 12 will be described. The chassis 12 is adapted for connection to the rack 16. In the depicted example, the chassis 12 is generally rectangular in shape. The chassis 12 includes a base 18, a first sidewall 20, an oppositely disposed second sidewall 22 and a cover 24. The base 18 includes a first end 26, an oppositely disposed second end 28, a first side 30 that extends between the first and second ends 26, 28 and an oppositely disposed second side 32. In the depicted example, the first end 26 is a front end of the base 18 while the second end 28 is a back end. In one example, the chassis 12 includes a major dimension W, which is measured from the first side 30 to the second side 32, and a minor dimension D, which is measured from the first end 26 to the second end 28. In the depicted example, the major dimension W is greater than the minor dimension D.

The chassis 12 also includes mounting brackets 44 at the front of the chassis 12 for mounting the chassis 12 to the rack/frame 16, in the depicted example, the mounting brackets 44 are each generally L-shaped and are fastened or otherwise secured to the side walls 20, 22 of the chassis 12.

The base 18, the first and second sidewalls 20, 22 and the cover 24 cooperatively define an interior region 52 of the chassis 12. The interior region 52 is adapted to receive the tray assembly 14. The front end of the chassis 12 defines a front opening 54 that provides access to the interior region 52. The back end of the chassis 12 defines a rear opening 56 (see FIG. 1) that provides access to the interior region 52. The tray assembly 14 can be inserted into and/or removed from the interior region 52 through either of the front opening 54 or the rear opening 56.

Figure 3:
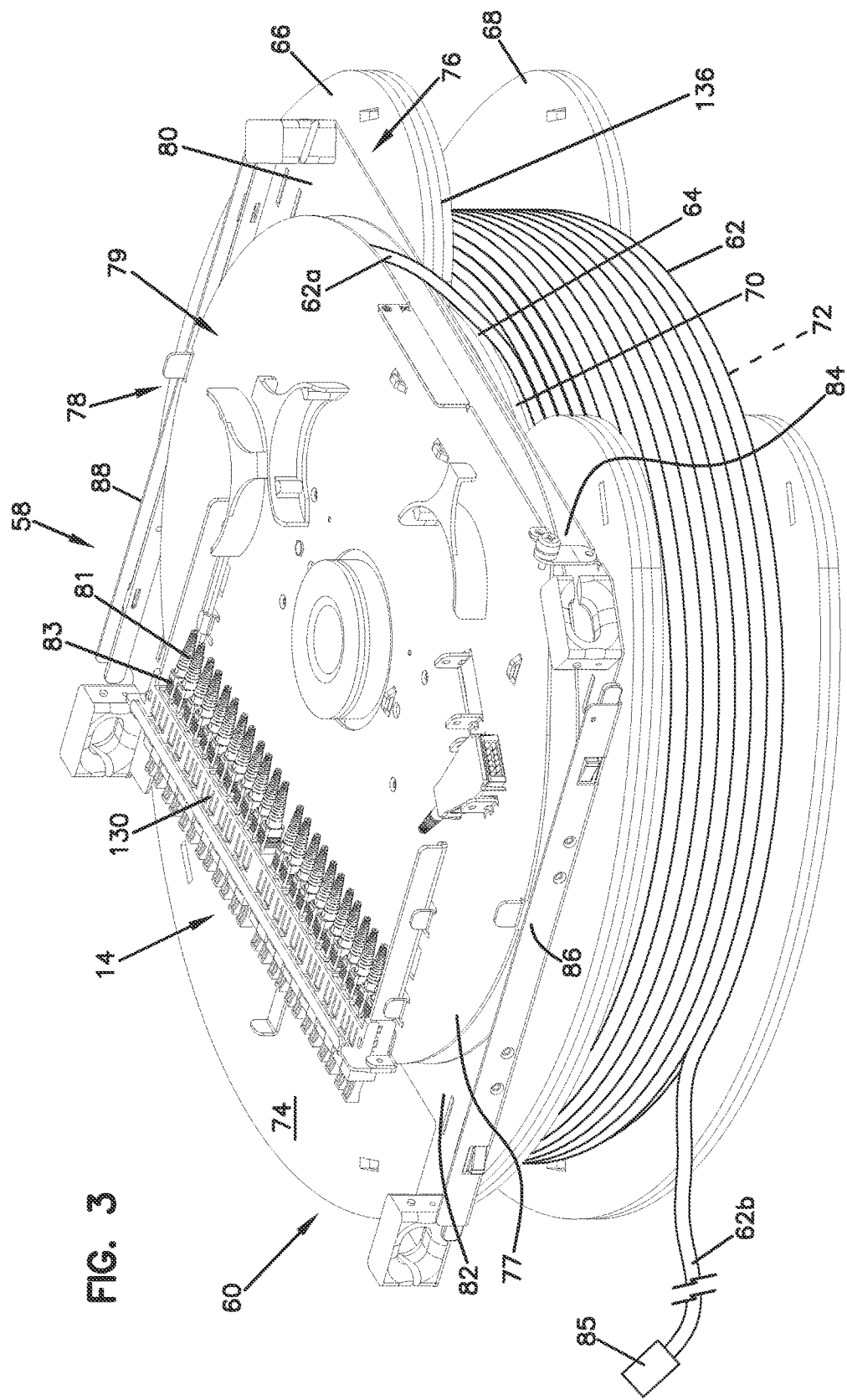
FIG. 3 is a perspective view of a cable assembly.

Referring to FIG. 3, a cable assembly 58 is shown. The cable assembly 58 includes the tray assembly 14 mounted to a cable spool 60. In the depicted embodiment, the cable spool 60 can hold a length of the fiber optic cable 62 that is greater than or equal to 500 feet of 3 mm fiber optic cable. In another embodiment, the cable spool 60 can hold a length of the fiber optic cable 62 that is greater than or equal to 1,000 feet of 3 mm fiber optic cable.

The cable spool 60 includes a drum 64, a first flange 66, and a second flange 68. The drum 64 is adapted to receive the fiber optic cable 62 coiled around the drum 64. The drum 64 includes a first axial end 70 and an oppositely disposed second axial end 72. The first flange 66 is engaged to the first axial end 70 of the drum 64. The second flange 68 is engaged to the second axial end 72 of the drum 64. The cable spool 60, including the drum 64 and/or flanges 66, 68, can be manufactured of a plastic material, a paper board material (e.g., cardboard or like material) or a recycled material. In one embodiment, the cable spool 60 is recyclable or disposable after use.

The tray assembly 14 is mounted to an outer surface 74 of the first flange 66 of the cable spool 60. The tray assembly 14 includes a tray 76 (e.g., a shelf, a drawer, etc.) and a cable spool assembly 78 rotatably mounted to the tray 76. A plurality of fiber optic adapters 130 are carried on an upper flange 77 of a spool 79 of the cable spool assembly 78. A first portion of the fiber optic cable 62 is coiled about the spool 79 and a second portion of the fiber optic cable 62 is coiled about the spool 60. The second portion of the cable 62 can be significantly longer than the first portion of the cable. The fiber optic cable 62 transitions from the spool 60 to the spool 79 through a notch 136 in the first flange 66. The notch 136 in the first flange 66 extends inwardly from an outer edge of the first flange 66 to the drum 64 such that the cable 62 can be routed from the drum 64 though the notch 136 to the spool 79. The cable 62 can include a plurality of optical fibers. A first end 62a of the cable 62 is managed at the tray assembly 14. The first end 62a of the cable 62 is routed from a storage region of the spool 79 (i.e., between the spool flanges) though a central region of the spool 79 to the top side of the upper flange 77. At the first end 62a of the cable 62, the optical fibers are fanned out (i.e., broken out) into separate connectorized pigtails 81 having connectorized ends 83 that are plugged into the adapters 130. A second end 62b of the cable 62 is accessible at the outside of the cable spool 60. At the second end 62b of the cable 62, the optical fibers of the cable 62 can be terminated at a multi-fiber connector 85. The tray assembly 14 is adapted for insertion and removal from the chassis 12 as a unit without requiring the cable spool assembly 78 to be detached from the tray 76. In other examples, other spool assemblies may be used. For example, the spool assemblies disclosed at U.S. provisional patent application Ser. No. 61/370,070, filed Aug. 2, 2010, and U.S. patent application Ser. No. 13/167,550, filed Jun. 23, 2011, hereby incorporated by reference in its entirety, can be included in certain embodiments.

The tray 76 includes a base panel 80 having a first end portion 82 (e.g., a front end portion), an oppositely disposed second end portion 84 (e.g., a back end portion), a first side portion 86 that extends at least partially between the first and second end portions 82, 84 and an oppositely disposed second side portion 88 that extends at least partially between the first and second end portions 82, 84. In the depicted embodiment, the first and second side portions 86, 88 extend outwardly from the base panel 80 in a generally perpendicular direction. In one embodiment, the tray assembly 14 is tied down to the first flange 66 so that the base panel 80 of the tray 76 abuts the outer surface 74 of the first flange 66.

Figure 4:
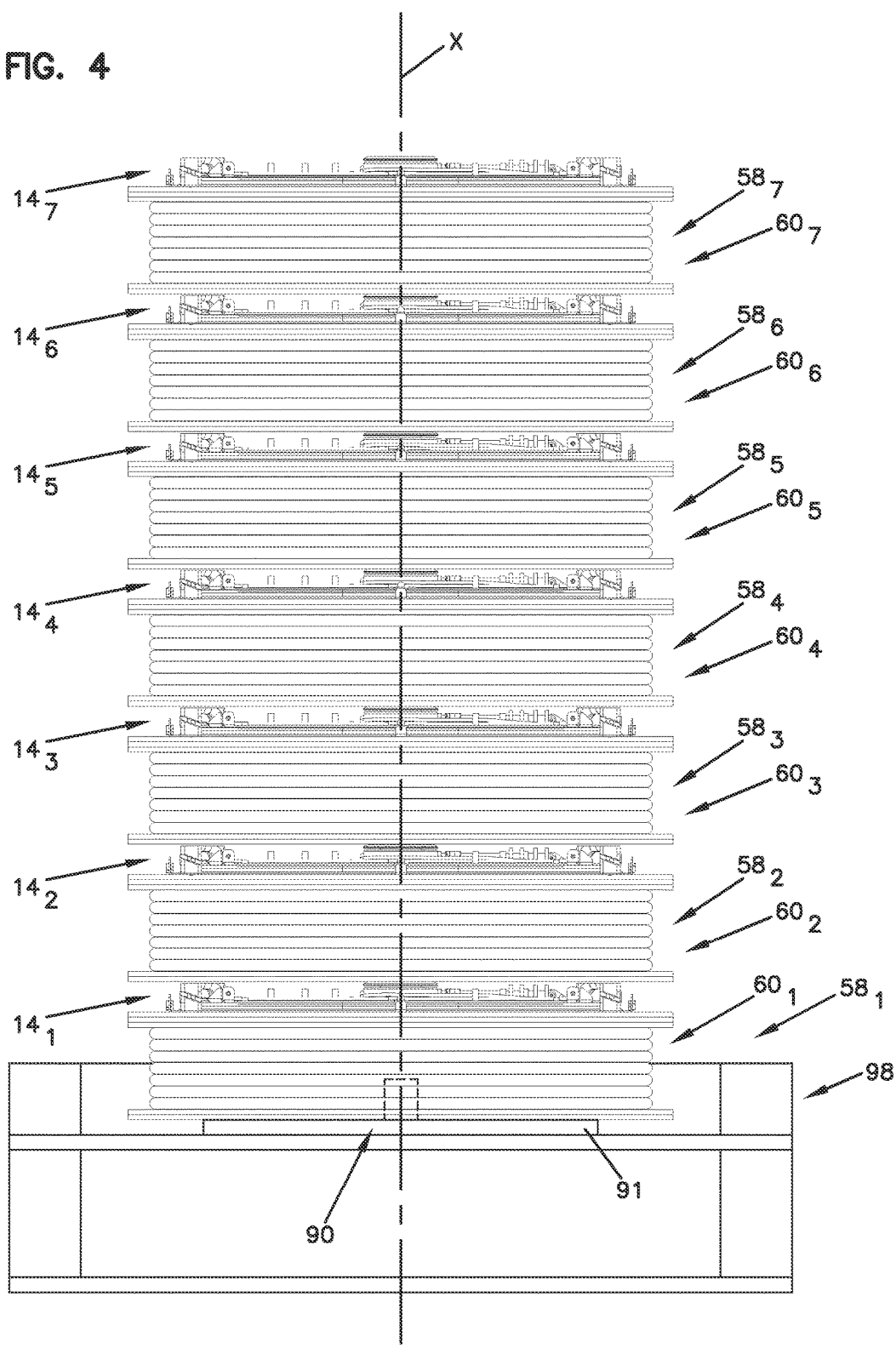
FIG. 4 is a side view of stacked cable assemblies on a pallet in accordance with the principles of the present disclosure.

FIG. 4 shows a plurality of the cable assemblies 58 (each including a tray 14 and a spool 60) arranged in a vertically stacked configuration along a vertical axis X. The bottommost cable assembly 58 is supported on a rotation structure 90 (e.g., a structure such as a carousel having a component (e.g., a platform) that is free to rotate about the axis X). It will be appreciated that the rotation structure 90 can include bearings, rollers, wheels or other structures for permitting a platform 91 of the rotation structure 90 to freely rotate about the axis X relative to a base of the rotation structure 90. As depicted, the rotation structure 90 is supported on a pallet 98 and the rotation structure 90 is configured such that the platform 91 can freely rotate about the axis X relative to the pallet 98. The stacked cable assemblies 58 can include cable assemblies $58_1$ to $58_7$ respectively including spools $60_1$ to $60_7$ and corresponding trays $14_1$ to $14_7$. It will be appreciated that the number of stacked cable assemblies can vary.

Figure 5:
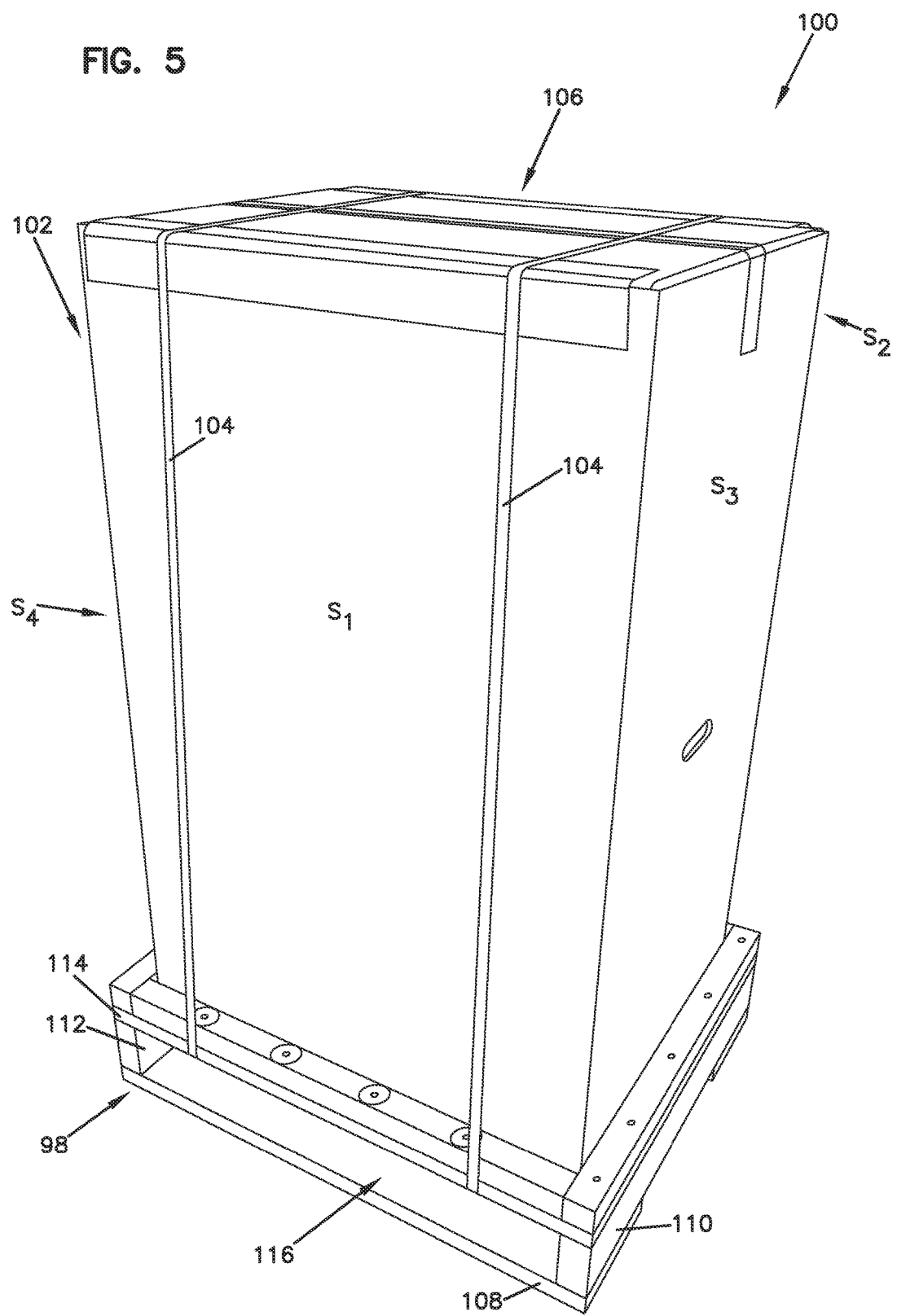
FIG. 5 is a perspective view of a packaging assembly having exemplary features of aspects in accordance with the principles of the present disclosure.
Figure 6:
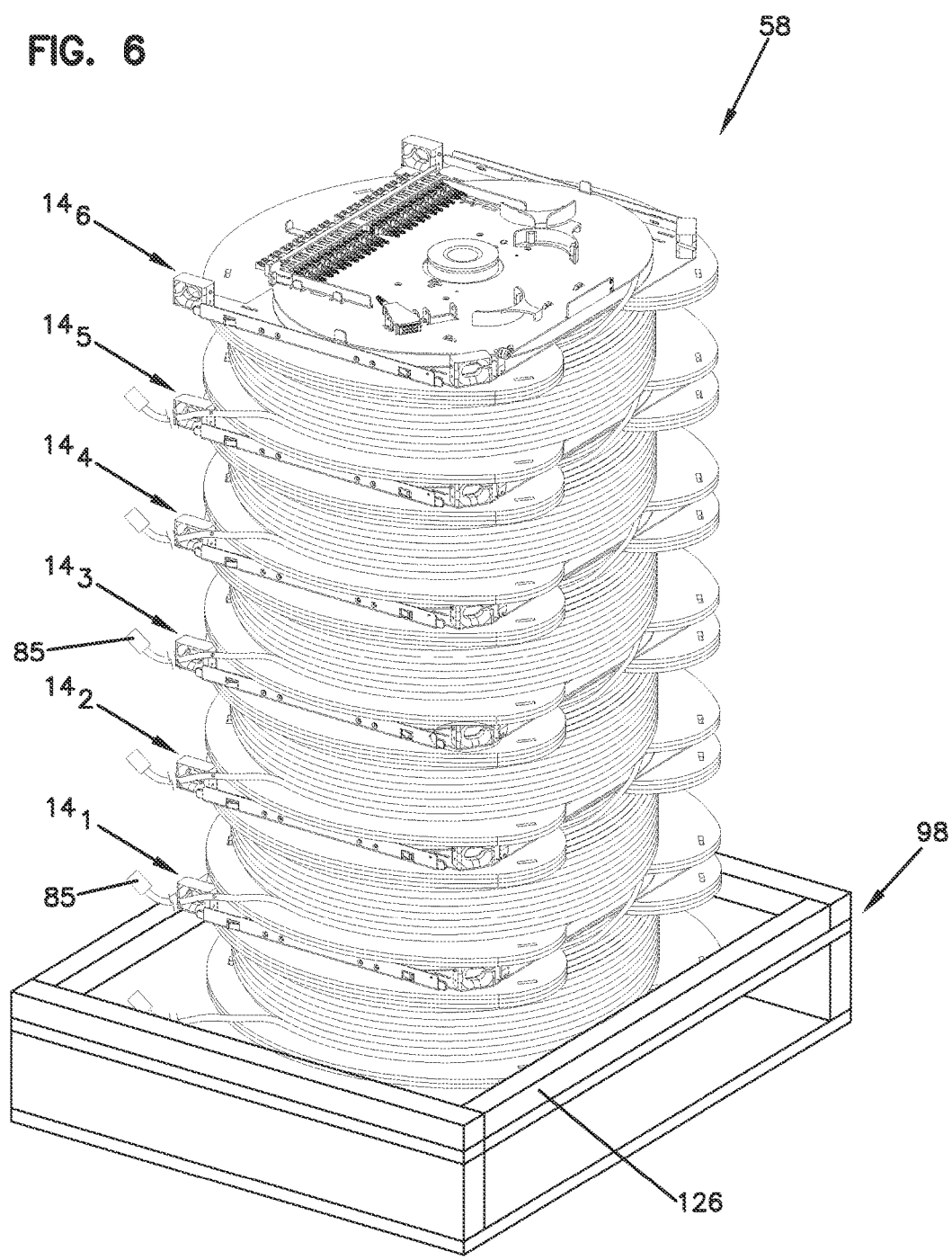
FIG. 6 is a perspective view of the stacked cable assemblies of FIG. 5; with a stop protection removed.

FIGS. 5-6 show an example of a package assembly 100 suitable for packaging the stack of cable assemblies 58 for transport/shipping. The package assembly 100 includes a cardboard box 102 containing the vertical stack of cable assemblies 58 (see FIG. 6). In other examples, the cardboard box 102 can be replaced by a box made of another material, such as polymer materials. The cable assemblies 58 are stacked vertically in the cardboard box 102. A variable number of cable assemblies 58 can cause the height of the cardboard box 102 to vary. A variation of the height of the cardboard box 102 can change with the number of cable assemblies 58 packaged therein.

The package assembly 100 is shown including four box sides $S_1$, $S_2$, $S_3$, $S_4$ and straps 104. The package assembly 100 can be fastened securely to the pallet 98 with the straps 104 (steel or plastic) so that the load will not shift from vibration of transportation and handling. The anchor straps 104 can be routed underneath the pallet 98 and around the sides $S_1$, $S_2$ of the cardboard box 102 and over a top cover 106 of the cardboard box 102.

In the depicted example, the pallet 98 can be a wood pallet box including a pallet base 108, right side 110, a left side 112, and a pallet top 114 to form a rugged container for shipping, fork truck handling, and stacking in storage. The pallet 98 defines an opening 116 for receiving forks of a truck lift to move the packaging assembly 100 from one location to another.

Figure 7:
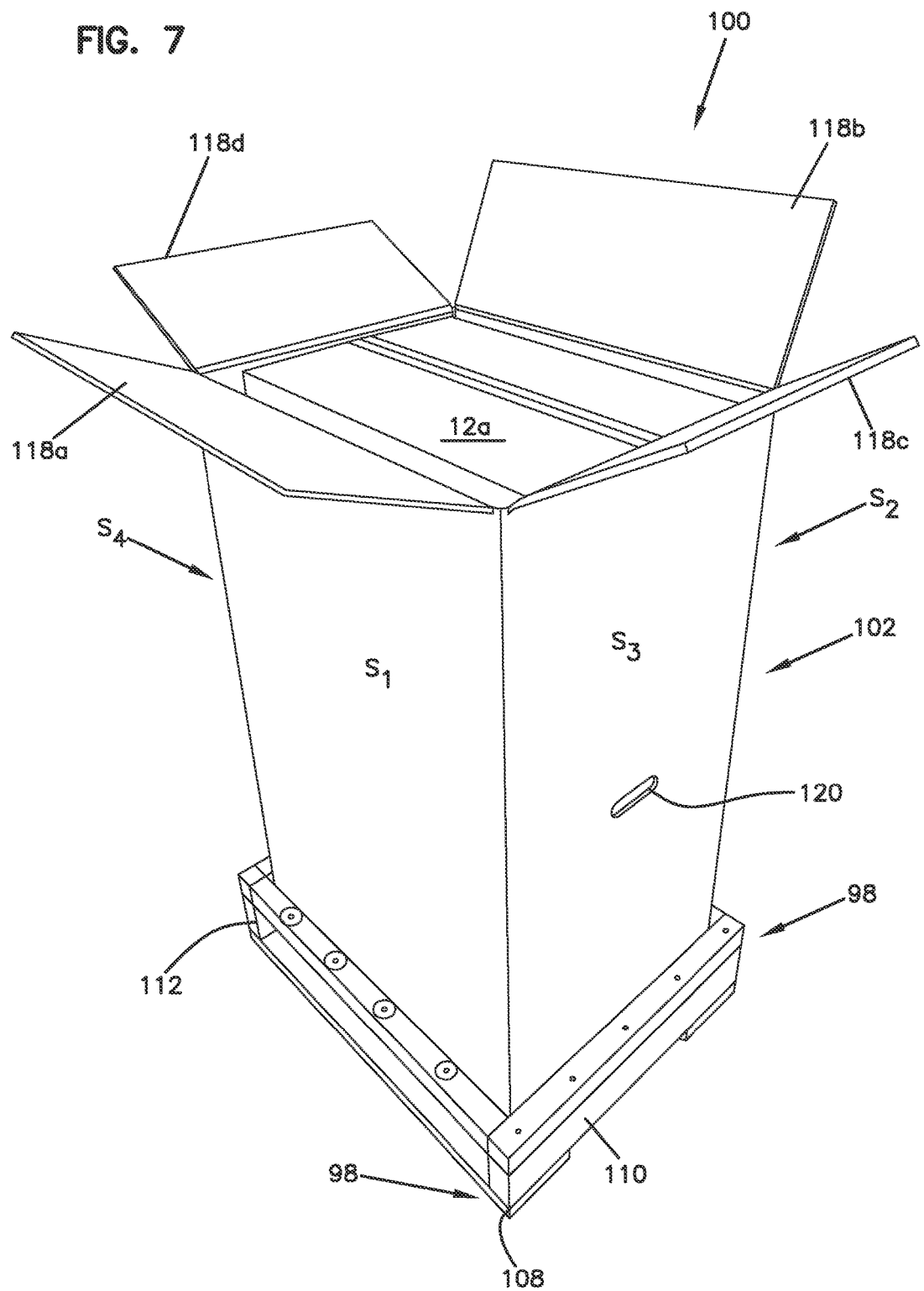
FIG. 7 is a perspective view of the packaging assembly of FIG. 6 with a cover opened and showing a packaged chassis.
Figure 8:
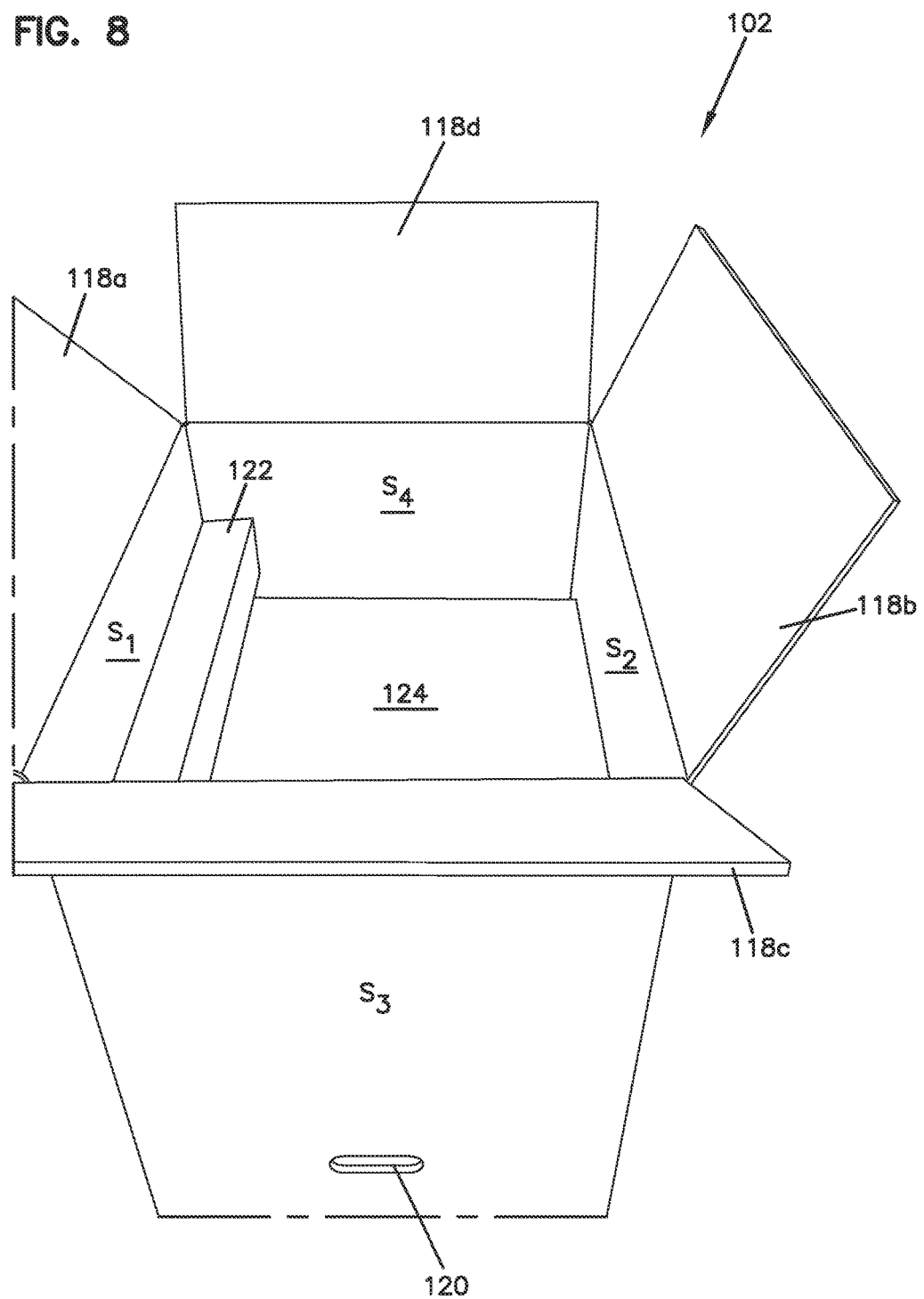
FIG. 8 is a top perspective view of the packaging assembly of FIG. 6 with the packaged chassis removed and showing a separator and liner.
Figure 9:
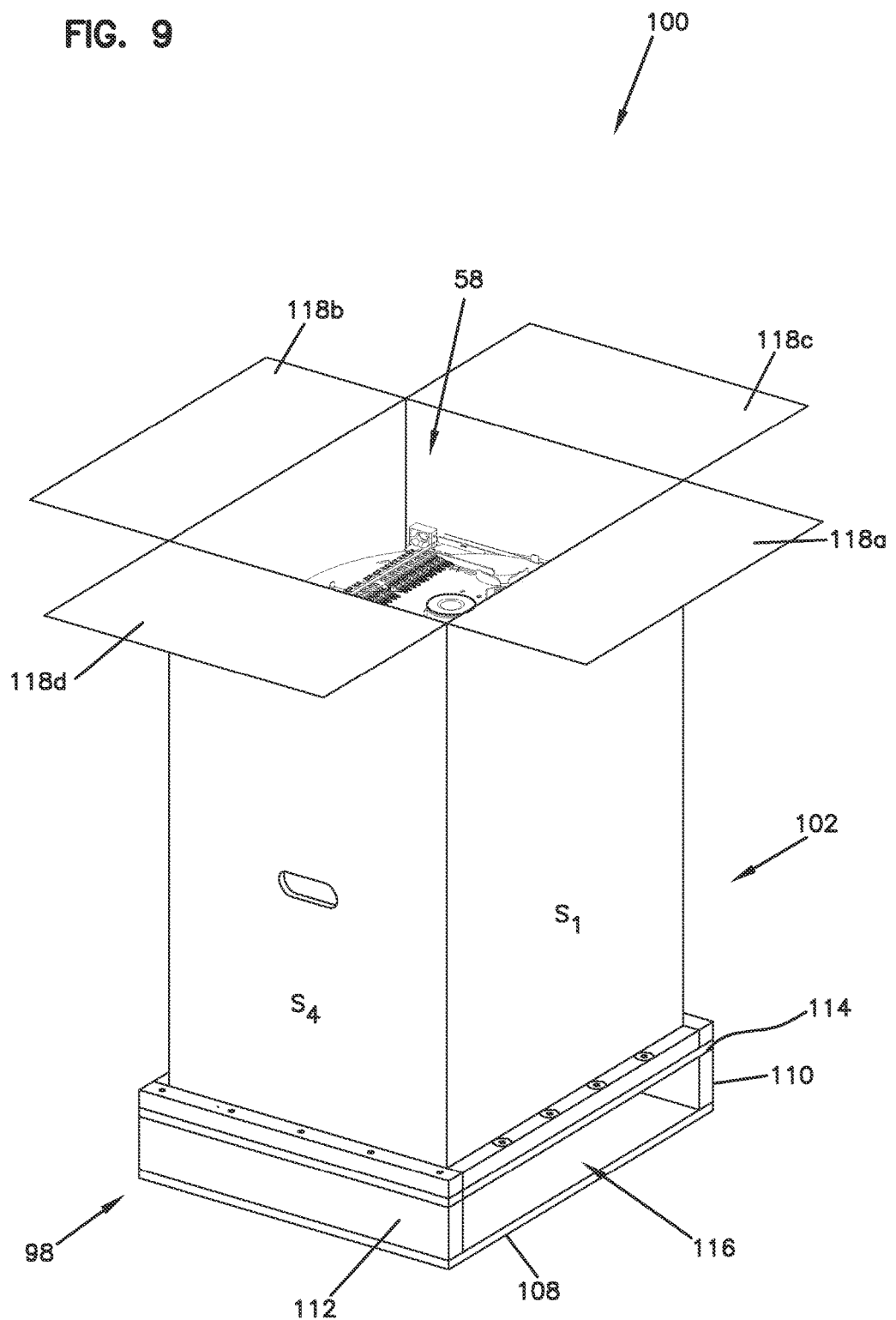
FIG. 9 is a perspective view of the packaging assembly of FIG. 6 with the separator and liner removed to show the stacked cable assemblies.

Referring to FIGS. 7-9, the package assembly 100 is shown with the straps 104 removed. In certain examples, the sides $S_1$, $S_2$, $S_3$, $S_4$ are provided with flaps 118a, 118b, 118c, and 118d respectively. These flaps 118a, 118b, 118c, and 118d are folded together and closed to form the top cover 106 (see FIG. 5) of the cardboard box 102. In the depicted example, the flaps 118a, 118b, 118c, and 118d are integral with the other sides $S_1$, $S_2$, $S_3$, $S_4$ of the cardboard box 102.

In certain examples, the packaging assembly 100 can also include a side opening 120 in each of sides $S_3$, $S_4$ of the cardboard box 102. This opening 120 can be obtained by providing cut-outs in the cardboard box 102. The side opening 120 provides for the packaging assembly 100 to be hand-carried. In the depicted example, the cardboard box 102 can include a number of boxed chassis 12a corresponding to the plurality of tray assemblies 14 (see FIG. 6) packaged therein.

Referring to FIG. 8, the cardboard box 102 is shown with the boxed chassis 12a removed. The cardboard box 102 can include separators 122 to create stable layers of product to adequately secure the load for fork truck handling. The cardboard box 102 may also include liners 124 to separate the various components being shipped within the package. The separators can be placed between layers and covers as necessary to stabilize the load.

Referring to FIG. 9, the cardboard box 102 is shown with the separator 122 and liner 124 removed. The cable assemblies 58 are shown packaged inside the cardboard box 102. In certain examples, the cable assemblies 58 can be stacked one on top of the other therein. In some examples, as many as seven cable assemblies 58 can be packaged therein. In other examples, the number of cable assemblies 58 can vary.

In one example, the cable assemblies 58 can be secured by appropriate banding, stretch or shrink-wrap, to prevent shifting when transported. With such protection, the load will not shift from vibration of transportation and handling. The stack of cable assemblies 58 can be positioned in front of or behind a telecommunications mount (e.g., rack 16, frame, etc.), which is adapted to receive the telecommunications assembly 10 depending on whether the telecommunications assembly 10 is to be installed from the front or back of the telecommunications mount. The cardboard box 102 can then be removed from the stack of cable assemblies 58.

Referring again to FIG. 6, the pallet 98 includes a spool protection member 126 that forms a protective lip at the top side of the pallet 98. The spool protection member is designed to prevent a fork-lift line from accidentally sliding over the top side of the pallet and damaging the bottom-most cable assembly 58. The spool protection 126 can be fastened (e.g., screwed, bolted, riveted, welded, bonded, etc.) to the top side of the pallet 98.

Figure 10:
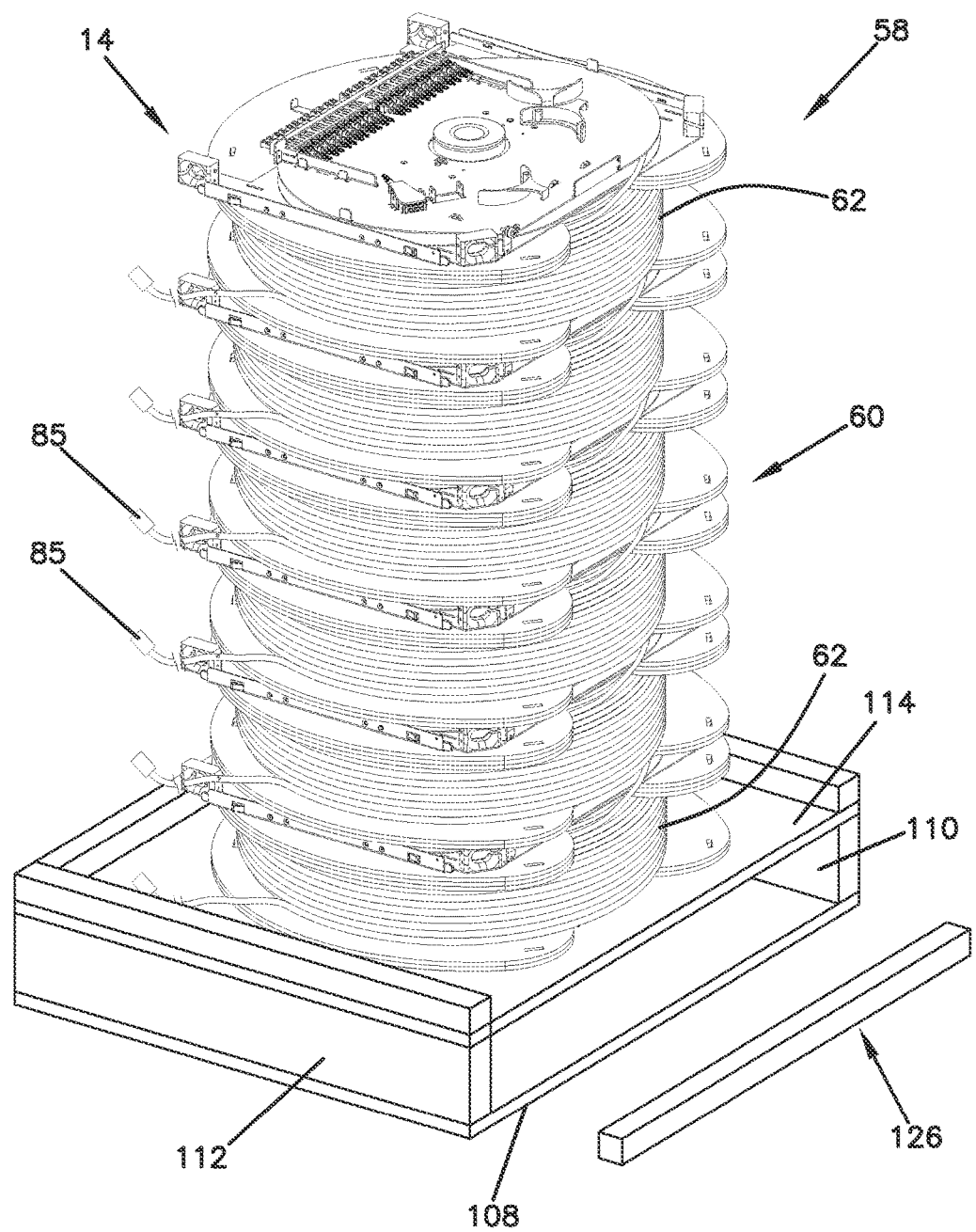
FIG. 10 is a perspective view of the stacked cable assemblies of FIG. 5 showing a spool stop protector removed.

Referring to FIG. 10, the pallet 98 is shown with the spool protection 126 removed. With the spool protection 126 removed, the cable 62 can be paid out from the bottom-most spool 60 without interference from the spool protection 126.

Figure 11:
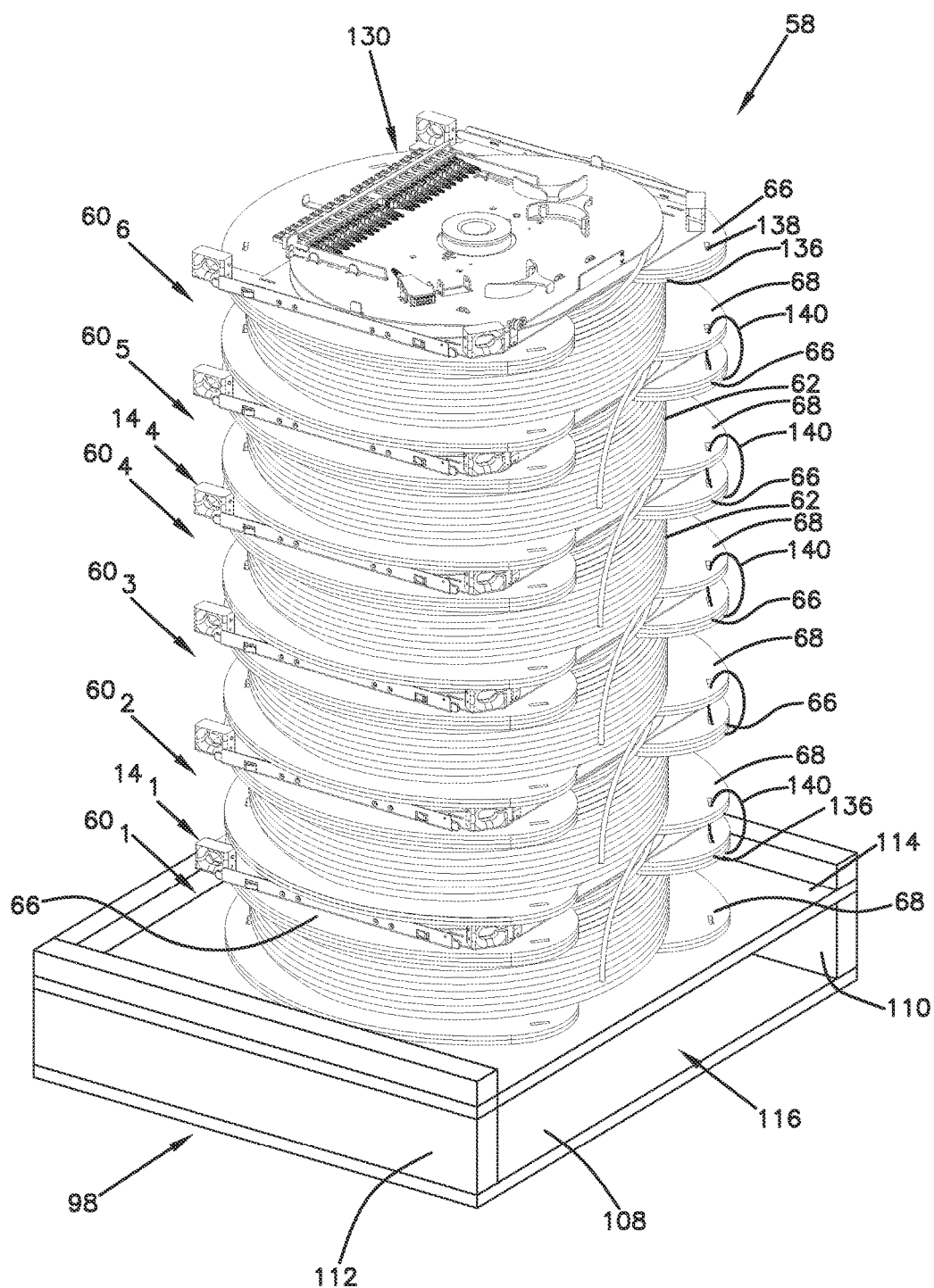
FIG. 11 is a perspective view of the stacked cable assemblies of FIG. 5 showing the cables being pulled simultaneously.

Referring to FIG. 11, in some examples the flanges of at least some of the cable spools 60 can be fastened together. For example, the upper flange 66 of the spool $60_1$ can be fastened to the lower flange 68 of the spool $60_2$, the upper flange 66 of the spool $60_2$ can be fastened to the lower flange 68 of the spool $60_3$, the upper flange 66 of the spool can be fastened to the lower flange 68 of the spool $60_4$, the upper flange 66 of the spool $60_4$ can be fastened to the lower flange 68 of the spool $60_5$, and the upper flange 66 of the spool $60_5$ can be fastened to the lower flange 68 of the spool $60_6$. The stack of cable assemblies 58 is supported on the platform 91 (see FIG. 4) of the rotatable structure 90 (see FIG. 4). Since the cable assemblies are linked together, the stacked cable assemblies 58 are all configured to rotate in unison with the platform 91 of the rotation structure 90 when the platform 91 rotates about the axis X (see FIG. 4).

In certain examples, the first and second flanges 66, 68 can include apertures 138. The apertures 138 can be adapted to receive a fastening structure 140 (e.g., zip tie) to restrain or hold the flanges of the cable spools 60 together on a stack for rotational purposes on the rotatable structure 90 (e.g., carousel). In the depicted example, the apertures 138 can be positioned adjacent to the notch 136 of the first or second flange 66, 68. In other examples, the apertures 138 can be positioned anywhere on the first or second flanges 66, 68.

To deploy the fiber optic cables 62 from the stacked cable assemblies 58, the pallet 98 is moved adjacent to a first installation location. In one example, the first installation location can be a rack (e.g., a frame) where it is desired to install the one or more chassis 12 that were shipped together with the cable assemblies 58 in the box 102. At the first installation location, the second ends 62b of the cables 62 are accessed and pulled to pay the second portions of the cables 62 out from their corresponding spools 60. In certain examples, only one cable 62 is pulled and deployed at a time. In other examples, a plurality of the cables 62 (e.g., 2, 3, 4, 5, 6 or more) are simultaneously pulled and paid off from their corresponding spools 60. In certain examples, all the cables 62 on the pallet 98 can be simultaneously deployed. In other examples, subsets of the total number of cables 62 can be simultaneously deployed (e.g., groups of 2 or 3 cables may be simultaneously deployed together). As the second ends 62b of the cables 62 are pulled, all of the cable assemblies 58 stacked on the rotatable structure 90 rotate in unison with each other and with the platform 91 of the rotatable structure 90 so as to allow the cables 62 being pulled to be paid off from their corresponding spools 60.

The second portions of the fiber optic cables 62 are paid out from their corresponding cable spools 60 until a sufficient cable length has been dispensed for the second ends 62b of the cables to be located at a second installation location that is remote form the first installation location. In certain examples, the second installation location can include a rack/frame holding telecommunications components that include ports for receiving the multi-fiber connectors 85 terminating the second ends 62b of the cables 62. If the deployment lengths of the cables 62 exceed the length of cable held by the spools 60, the first portions of the cable 62 can be accessed from the spools 79 to provide additional cable length. Once the second ends 62b have been connected at the second installation location, the spools 60 can be uncoupled from one another (e.g., the ties 140 can be cut) and the cable assemblies 58 can be unstacked. Thereafter, the tray assemblies 14 can be removed from their corresponding spool 60 and loaded into the one or more chassis 12 installed at the first installation location. Cable length for moving the tray assemblies 14 to the first installation locations can be provided by the first portions of the cables 62 stored at the spools 79. Excess cable length can be stored/managed by the spools 79 or elsewhere at the first installation location. In one example, the cable spools 60 are discarded (e.g., disposed of or recycled) after deployment of the cable assemblies 58.

From the forgoing detailed description, it will be evident that modifications and variations can be made without departing from the spirit and scope of the disclosure.

The invention claimed is:
1. An assembly comprising:
a pallet;
a carousel mounted on the pallet;
a plurality of tray assemblies stacked one on top of the other on the carousel, each one of the plurality of tray assemblies including: a tray body, at least one fiber optic adapter supported at a top side of the tray body, a first spool mounted beneath the tray body, the first spool having spaced-apart flanges, and a fiber optic cable wrapped about the first spool at a location between the spaced-apart flanges;
wherein each one of the plurality of tray assemblies includes a different fiber optic cable that is wrapped about respective first spools;

wherein at least some of the spaced-apart flanges of the first spools of adjacent tray assemblies are coupled together;

wherein the spaced-apart flanges are coupled together with fastening structures that include ties;

wherein the spaced-apart flanges define openings for receiving the ties; and wherein the spaced-apart flanges are cardboard.

2. The assembly of claim 1, wherein the first spools are aligned along a vertical axis.

3. The assembly of claim 1, wherein each one of the plurality of tray assemblies also includes a second spool rotatably mounted at the top side of the tray body.

4. The assembly of claim 1, further comprising a box supported on the pallet that encloses the plurality of tray assemblies.

5. The assembly of claim 1, wherein all of the first spools are coupled together.

6. The assembly of claim 5, wherein all of the first spools rotate in unison with the carousel when respective fiber optic cables are respectively dispensed from the first spools during deployment of the plurality of tray assemblies.

7. The assembly of claim 5, wherein the plurality of tray assemblies are deployed by pulling all of the fiber optic cables at once thereby causing all of the first spools to rotate in unison with each other and in unison with the carousel.

8. An assembly comprising:

a pallet;

a carousel mounted on the pallet;

a plurality of tray assemblies stacked one on top of the other on the carousel, each one of the plurality of tray assemblies including: a tray body, at least one fiber optic adapter supported at a top side of the tray body, a first spool mounted beneath the tray body, the first spool having spaced-apart flanges, and a fiber optic cable wrapped about the first spool at a location between the spaced-apart flanges;

wherein each one of the plurality of tray assemblies includes a different fiber optic cable that is wrapped about respective first spools;

wherein at least some of the spaced-apart flanges of the first spools of adjacent tray assemblies are coupled together; and wherein each one of the plurality of tray assemblies also includes a second spool rotatably mounted at the top side of the tray body.

9. An assembly comprising:

a pallet;

a carousel mounted on the pallet;

a plurality of tray assemblies stacked one on top of the other on the carousel, each one of the plurality of tray assemblies including: a tray body, at least one fiber optic adapter supported at a top side of the tray body, a first spool mounted beneath the tray body, the first spool having spaced-apart flanges, and a fiber optic cable wrapped about the first spool at a location between the spaced-apart flanges;

wherein each one of the plurality of tray assemblies includes a different fiber optic cable that is wrapped about respective first spools;

wherein at least some of the spaced-apart flanges of the first spools of adjacent tray assemblies are coupled together;

wherein the spaced-apart flanges are coupled together with fastening structures that include ties;

wherein the spaced-apart flanges define openings for receiving the ties; and wherein each one of the plurality of tray assemblies also includes a second spool rotatably mounted at the top side of the tray body.

\* \* \* \* \*